United States Patent
Wang et al.

(10) Patent No.: US 6,497,227 B2
(45) Date of Patent: Dec. 24, 2002

(54) SYSTEM FOR DIAGNOSING FAULT CONDITIONS ASSOCIATED WITH AN AIR HANDLING SYSTEM FOR AN INTERNAL COMBUSTION ENGINE

(75) Inventors: Yue Yun Wang, Columbus, IN (US); Paul R. Miller, Columbus, IN (US); Eric K. Bradley, Columbus, IN (US); Salim A. Jaliwala, Columbus, IN (US); Kevin M. Otto, Columbus, IN (US); Philip Dimpelfeld, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 28 days.

(21) Appl. No.: 09/773,649

(22) Filed: Jan. 31, 2001

(65) Prior Publication Data

US 2002/0144674 A1 Oct. 10, 2002

(51) Int. Cl.$^7$ ............................................. F02M 25/07
(52) U.S. Cl. .................. 123/568.16; 60/602; 60/605.2; 123/568.21
(58) Field of Search ....................... 123/568.16, 568.21; 60/602, 605.1, 605.2, 612; 73/117.3; 701/107, 108

(56) References Cited

U.S. PATENT DOCUMENTS

| | | |
|---|---|---|
| 4,690,120 A | 9/1987 | Egle |
| 4,823,798 A | 4/1989 | Ichikawa |
| 5,150,695 A | 9/1992 | Kondo |
| 5,257,610 A | 11/1993 | Ohuchi |
| 5,337,725 A | 8/1994 | Narita |
| 5,368,005 A | 11/1994 | Kako |
| 5,461,569 A | 10/1995 | Hara et al. |
| 5,474,051 A | 12/1995 | Matsumoto et al. |
| 5,488,938 A | 2/1996 | Ohuchi |
| 5,508,926 A | 4/1996 | Wade |
| 5,513,616 A | 5/1996 | Matsumoto et al. |
| 5,542,400 A | 8/1996 | Matsumoto et al. |
| 5,621,167 A | 4/1997 | Fang-Cheng |
| 5,632,257 A | 5/1997 | Machida et al. |
| 5,635,633 A | 6/1997 | Kadota |
| 5,653,212 A | 8/1997 | Hotta et al. |
| 5,727,533 A | 3/1998 | Bidner et al. |

*Primary Examiner*—Gene Mancene
*Assistant Examiner*—Arnold Castro
(74) *Attorney, Agent, or Firm*—Barnes & Thornburg

(57) ABSTRACT

A system for diagnosing fault conditions associated with an air handling system for an internal combustion engine includes an air handling control mechanism responsive to a mechanism command to control fluid flow through an air handling system of an internal combustion engine. An engine controller is configured to compute predicted responses of a number of engine operating parameters each as a different function of the mechanism command, and to compute a corresponding number of correlation coefficients each as a function of one of the engine operating parameter signals and a corresponding one of the predicted responses. The controller is operable to diagnose a fault associated with the air handling control mechanism if at least some of the correlation coefficients are below a first threshold, and to diagnose a properly functioning air handling control mechanism if at least some of the correlation coefficients are above a second threshold.

33 Claims, 5 Drawing Sheets

SYSTEM FOR DIAGNOSING FAULT CONDITIONS ASSOCIATED WITH AN AIR HANDLING SYSTEM FOR AN INTERNAL COMBUSTION ENGINE

FIELD OF THE INVENTION

The present invention relates generally to diagnostic systems for internal combustion engines, and more specifically to systems for diagnosing fault conditions associated with air handling systems including EGR components, a variable geometry turbocharger, a wastegate and/or an exhaust throttle.

BACKGROUND OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold.

EGR operation is typically not required under all engine operating conditions, and known EGR systems accordingly include a valve, commonly referred to as an EGR valve, for controllably introducing exhaust gas to the intake manifold. Through the use of an on-board microprocessor, control of the EGR valve is typically accomplished as a function of information supplied by a number of engine operational sensors.

In addition to an EGR valve, air handling systems for modern turbocharged internal combustion engines are known to include one or more supplemental or alternate air handling control mechanisms for modifying the swallowing capacity and/or efficiency of the turbocharger. For example, the air handling system may include a wastegate disposed between an inlet and outlet of the turbocharger turbine to selectively route exhaust gas around the turbine and thereby control the swallowing capacity of the turbocharger. Alternatively or additionally, the system may include an exhaust throttle disposed in line with the exhaust conduit either upstream or downstream of the turbocharger turbine, wherein the effective flow area of the exhaust is throttle is controlled to thereby control the efficiency of the turbocharger. Finally, the turbocharger may include a variable geometry turbine, wherein the swallowing capacity of the turbocharger is controlled by controlling the geometry of the turbine.

Regardless of the number or type of air handling control mechanisms used, it is important to monitor the functionality of such mechanisms for faults or failures that may occur during operation thereof. For example, if any of the foregoing air handling control mechanisms fail due to valve sticking or similar faults, it is desirable to monitor such conditions and log appropriate faults when they occur. However, it is not desirable to monitor the operation of such air handling control mechanisms using actual air handling control mechanism sensors since some failures attributable to the air handling control mechanisms may not be distinguishable from failures attributable to the sensors themselves. What is therefore needed is a system for diagnosing fault conditions associated with air handling control mechanisms that compares the effect of the air handling control mechanisms on one or more engine operating parameters with predicted behavior thereof. Such a diagnostic system should further include the capability of distinguishing air handling control mechanism failures and fault conditions from those associated with the one or more engine operating parameter sensors.

SUMMARY OF THE INVENTION

The foregoing shortcomings of the prior art are addressed by the present invention. In accordance with one aspect of the present invention, a system for diagnosing fault conditions associated with an air handling control mechanism for an internal combustion engine comprises an air handling control mechanism responsive to a mechanism command to control fluid flow through an air handling system of an internal combustion engine, means for modeling a predicted response of an engine operating parameter as a function of the mechanism command, means for monitoring the engine operating parameter and producing an engine operating parameter signal corresponding thereto, means for computing a correlation coefficient as a function of the engine operating parameter signal and the predicted response, and means for diagnosing a fault associated with the air handling control mechanism if the correlation coefficient is below a first coefficient threshold.

In accordance with another aspect of the present invention, a system for diagnosing fault conditions associated with an air handling control mechanism for an internal combustion engine comprises an air handling control mechanism responsive to a mechanism command to control fluid flow through an air handling system of an internal combustion engine, an engine parameter sensor producing an engine operating parameter signal indicative of an operational state of an engine operating parameter, and an engine controller modeling a predicted response of the engine operating parameter as a function of the mechanism command, the engine controller computing a correlation coefficient as a function of the engine operating parameter signal and the predicted response and diagnosing a fault associated with the air handling control mechanism if the correlation coefficient is below a first coefficient threshold.

In accordance with a further aspect of the present invention, a system for diagnosing fault conditions associated with an air handling control mechanism for an internal combustion engine comprises an air handling control mechanism responsive to a mechanism command to control fluid flow through an air handling system of an internal combustion engine, a number of engine parameter sensors producing engine operating parameter signals indicative of operational states of a corresponding number of different engine operating parameters, and an engine controller modeling predicted responses of the number of engine operating parameters each as a different function of the mechanism command, the controller computing a number of correlation coefficients each as a function of one of the number of engine operating parameter signals and a corresponding one of the predicted responses, the controller diagnosing a fault associated with the air handling control mechanism if at least some of the correlation coefficients are below a first coefficient threshold.

One object of the present invention is to provide a system for diagnosing fault conditions associated with an air handling system for an internal combustion engine.

Another object of the present invention is to provide such a system for diagnosing fault conditions associated with an EGR valve, a wastegate, an exhaust throttle and/or a variable geometry turbocharger.

Yet another object of the present invention is to provide such a system for diagnosing fault conditions based on predicted responses of a number of engine operating conditions each modeled as a function of an air handling mechanism control signal.

These and other objects of the present invention will become more apparent from the following description of the preferred embodiments.

DESCRIPTION OF THE PREFERRED EMBODIMENTS

Figure 1:
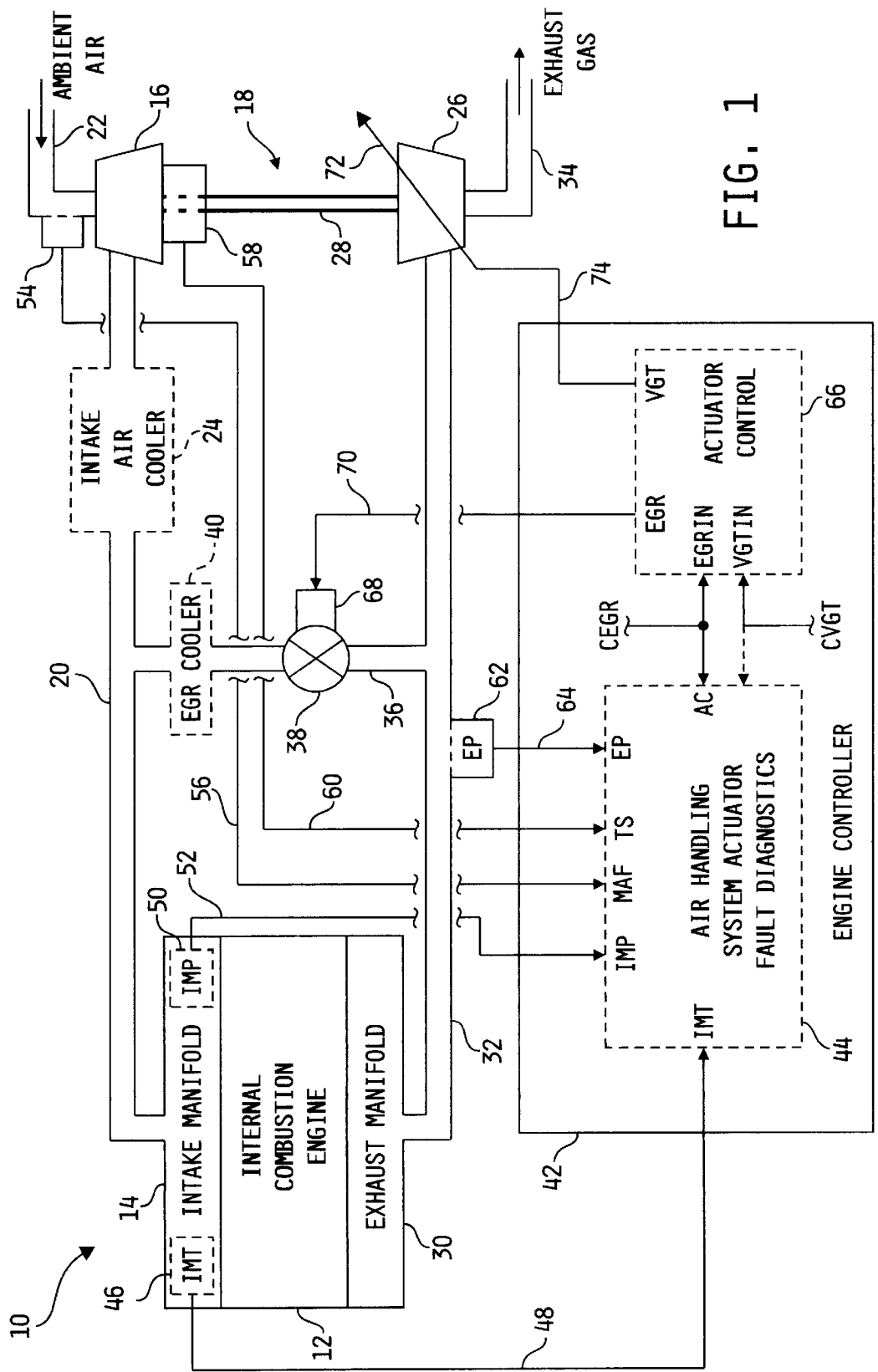
FIG. 1 is a diagrammatic illustration of one preferred embodiment of a diagnostic system for an air handling system of an internal combustion engine, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a diagnostic system 10 for an air handling system of an internal combustion engine, in accordance with the present invention, is shown. System includes an internal combustion engine 12 having an intake manifold 14 fluidly coupled to a compressor 16 of a turbocharger 18 via intake conduit 20, wherein the compressor 16 receives fresh air via fresh air conduit 22. Optionally, as shown in phantom in FIG. 1, system 10 may include an air intake cooler 24 of known construction disposed in line with intake conduit 20 between the turbocharger compressor 16 and the intake manifold 14. The turbocharger compressor 16 is mechanically coupled to a turbocharger turbine 26 via drive shaft 28, wherein turbine 26 is fluidly coupled to an exhaust manifold 30 of engine 12 via exhaust conduit 32, and is further fluidly coupled to ambient via exhaust conduit 34. The exhaust conduit 32 is fluidly coupled to intake conduit 20 via an EGR conduit 36 having an EGR valve 38 of known construction disposed in line therewith. An EGR cooler 40 of known construction may optionally be disposed between EGR valve 36 and intake conduit 20 as shown in phantom in FIG. 1.

System 10 includes an engine controller 42 that is preferably microprocessor-based and is generally operable to control and manage the overall operation of engine 12. Engine controller 42 includes a memory unit (not shown in FIG. 1) as well as a number of inputs and outputs for interfacing with various sensors and systems coupled to engine 12. Controller 42, in one embodiment, may be a known control unit sometimes referred to as an electronic or engine control module (ECM), electronic or engine control unit (ECU) or the like, or may alternatively be a general control circuit capable of operation as described hereinafter.

System 10 includes a number of sensors and sensing systems for providing the engine controller 42 with information relating to the operation of engine 12. For example, system 10 includes an intake manifold temperature sensor 46 in fluid communication with intake manifold 14, wherein sensor 46 is operable to sense the temperature of charge entering intake manifold 14. Intake manifold temperature sensor 46 is preferably of known construction and is electrically connected to an intake manifold temperature input (IMT) of an air handling system actuator fault diagnostics block 44 of engine controller 42 via signal path 48. System 10 further includes an intake manifold pressure sensor 50 of known construction in fluid communication with the intake manifold 14 and producing an intake manifold pressure signal on signal path 52 indicative of intake manifold pressure. The intake manifold pressure sensor 50 is preferably of known construction and is electrically connected to an intake manifold pressure input (IMP) of block 44 via signal path 52.

System 10 further includes a turbocharger speed sensor 58 preferably of known construction and disposed about turbocharger driveshaft 28, wherein sensor 58 is operable to produce a turbocharger speed signal on signal path 60 indicative of turbocharger rotational speed. Sensor 58 is preferably of known construction and is electrically connected to a turbocharger speed input (TS) of the air handling system actuator fault diagnostics block 44 via signal path 60. System 10 further includes a mass airflow sensor 54 fluidly coupled to intake conduit 22 and operable to produce a signal indicative of the mass flow of air into turbocharger compressor 16. Mass airflow sensor 54 is preferably of known construction and is electrically connected to a mass airflow input (MAF) of block 44 via signal path 56. System 10 further includes an exhaust pressure sensor 62 in fluid communication with exhaust conduit 32 (or exhaust manifold 30) and is operable to produce a signal indicative of exhaust gas flowing through exhaust conduit 32. Sensor 62 is preferably of known construction and is electrically connected to an exhaust pressure input (EP) of the air handling system actuator fault diagnostics block 44 via signal path 64.

The air handling system actuator fault diagnostics block 44 further includes an air handling control mechanism command input (AC) receiving an air handling/EGR system actuator command value threat. For example, as shown in FIG. 1, block 44 is configured in one embodiment to receive a commanded EGR value (CEGR). Alternatively, as shown in phantom in FIG. 1, the air handling control mechanism command input (AC) of block 44 may be configured to receive a commanded VGT value (CVGT). In the former case, the commanded EGR value (CEGR) is generated internally to engine controller 42 and is intended to control the position of EGR valve 38 to a desired valve position. In the latter case, the commanded VGT value (CVGT) is also generated internal to engine controller 42, and is intended to control the swallowing capacity and/or efficiency of the turbocharger turbine 26 via one or more air handling control mechanisms therefore as will be described in greater detail hereinafter. In either case, engine controller 42 further includes an actuator control block 66 having an EGR input (EGRIN) receiving the commanded EGR value (CEGR) and a VGT input (VGTIN) receiving the commanded VGT value (CVGT) and producing corresponding EGR and VGT drive signals at respective outputs thereof. The EGR output of actuator control block 66 is electrically connected to an EGR valve actuator 68 via signal path 70, and the VGT output of actuator control block 66 is electrically connected to a turbocharger swallowing capacity control mechanism 72 via signal path 74.

Figure 2A:
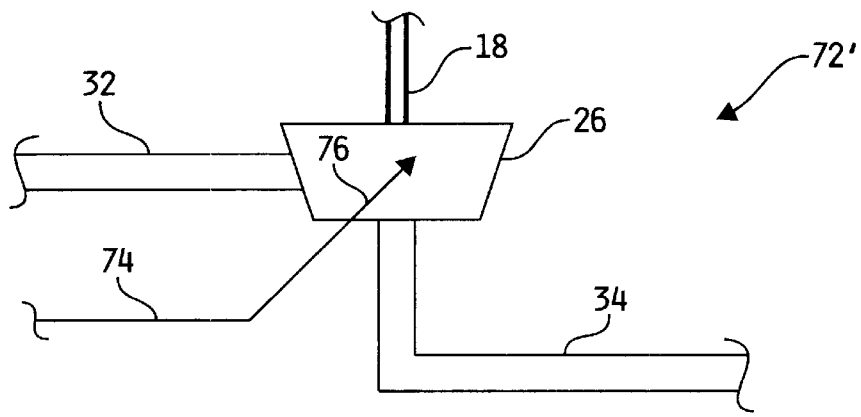
FIG. 2A is a diagrammatic illustration of one embodiment of a mechanism for controlling the swallowing capacity/efficiency of the turbocharger of FIG. 1.
Figure 2B:
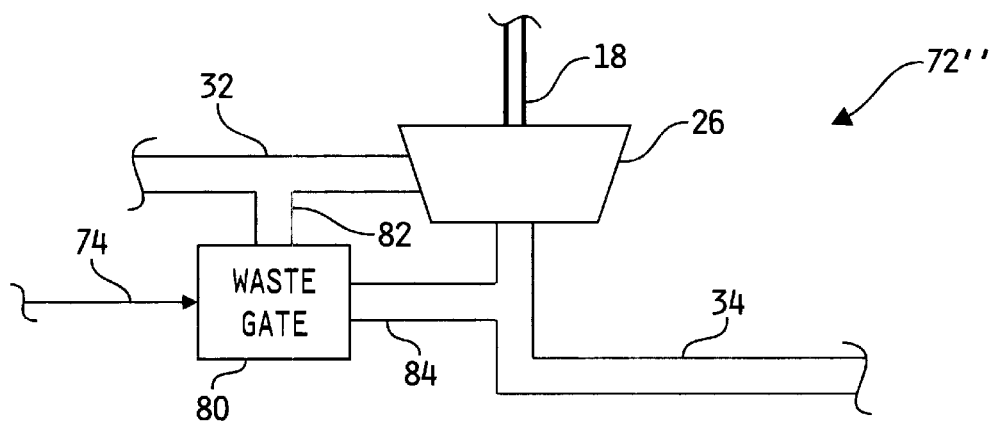
FIG. 2B is a diagrammatic illustration of another embodiment of a mechanism for controlling the swallowing capacity/efficiency of the turbocharger of FIG. 1.
Figure 2C:
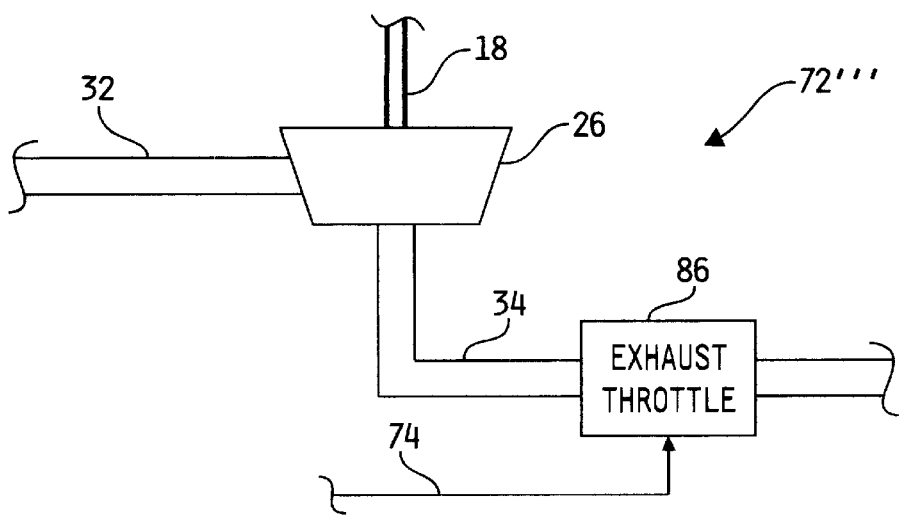
FIG. 2C is a diagrammatic illustration of yet another embodiment of a mechanism for controlling the swallowing capacity/efficiency of the turbocharger of FIG. 1.

Referring now to FIGS. 2A–2C, a number of different embodiments of the turbocharger swallowing capacity/efficiency control mechanism 72, in accordance with the present invention, are shown. For example, referring to FIG. 2A, one particular turbocharger swallowing capacity/efficiency control mechanism embodiment 72' includes a known electronically controllable variable geometry turbocharger turbine 26 responsive to the VGT control signal on signal path 74 to establish a corresponding turbine geometry as illustrated in FIG. 2A by signal line 76. The effective swallowing capacity of turbocharger turbine 26 is defined by the turbine geometry which, in turn, defines the exhaust gas flow capacity through turbine 26 as is known in the art.

Referring to FIG. 2B, another turbocharger swallowing capacity/efficiency control mechanism embodiment 72" is shown and includes a wastegate 80 of known construction having one end fluidly coupled to exhaust conduit 32 via conduit 82 and an opposite end fluidly coupled to exhaust conduit 34 via conduit 84. In this embodiment, wastegate 80 is responsive to the VGT control signal on signal path 74 to establish a corresponding flow area therethrough. By diverting exhaust gas flowing through exhaust conduit 32 away from the inlet of turbine 26 toward exhaust conduit 34, the swallowing capacity of the turbocharger turbine 26 may thus be modified via appropriate control of wastegate 80.

Referring now to FIG. 2C, a turbocharger swallowing capacity/efficiency control mechanism embodiment 72''' is shown and includes an exhaust throttle 86 of known construction and disposed in line with exhaust conduit 34. In this embodiment, exhaust throttle 86 is responsive to the VGT control signal on signal path 74 to establish a corresponding flow area therethrough. By restricting the flow of exhaust gas through exhaust conduit 34, the efficiency of the turbocharger turbine 26 (and therefore the swallowing capacity of the turbocharger) may thus be modified via appropriate control of exhaust throttle 86.

It is to be understood that while air handling control mechanism embodiments have been separately illustrated and described with respect to FIGS. 2A–2C, the present invention contemplates using any one or combination of the variable geometry turbocharger 76, wastegate 80 and exhaust throttle 86 structures to modify turbocharger swallowing capacity and/or turbocharger efficiency. In embodiments including wastegate 80 and exhaust throttle 86, those skilled in the art will recognize that the wastegate outlet conduit 84 may be fluidly coupled to exhaust conduit 34, either upstream or downstream of exhaust throttle 86. As it relates to the present invention, the phrase "air handling control mechanism" is thus defined as any one, or combination of, an EGR valve, a wastegate, an exhaust throttle and a variable geometry turbocharger.

In accordance with the present invention, engine controller 42 is operable to command one of the air handling control mechanisms described with respect to FIGS. 1 and/or 2A–2C to an opened or a closed position, while the remaining mechanisms remain fixed, and to take measurements from one or more of the engine operating parameter sensors described with respect to FIG. 1. Based on a multiple sensor fusion algorithm and a decision-making algorithm contained within the air handling system actuator fault diagnostic block 44, engine controller 42 is operable to detect air handling control mechanism-related failures and fault conditions, and to further isolate such failures and fault conditions from failures and fault conditions associated with any of the engine operating parameter sensors.

Figure 4:
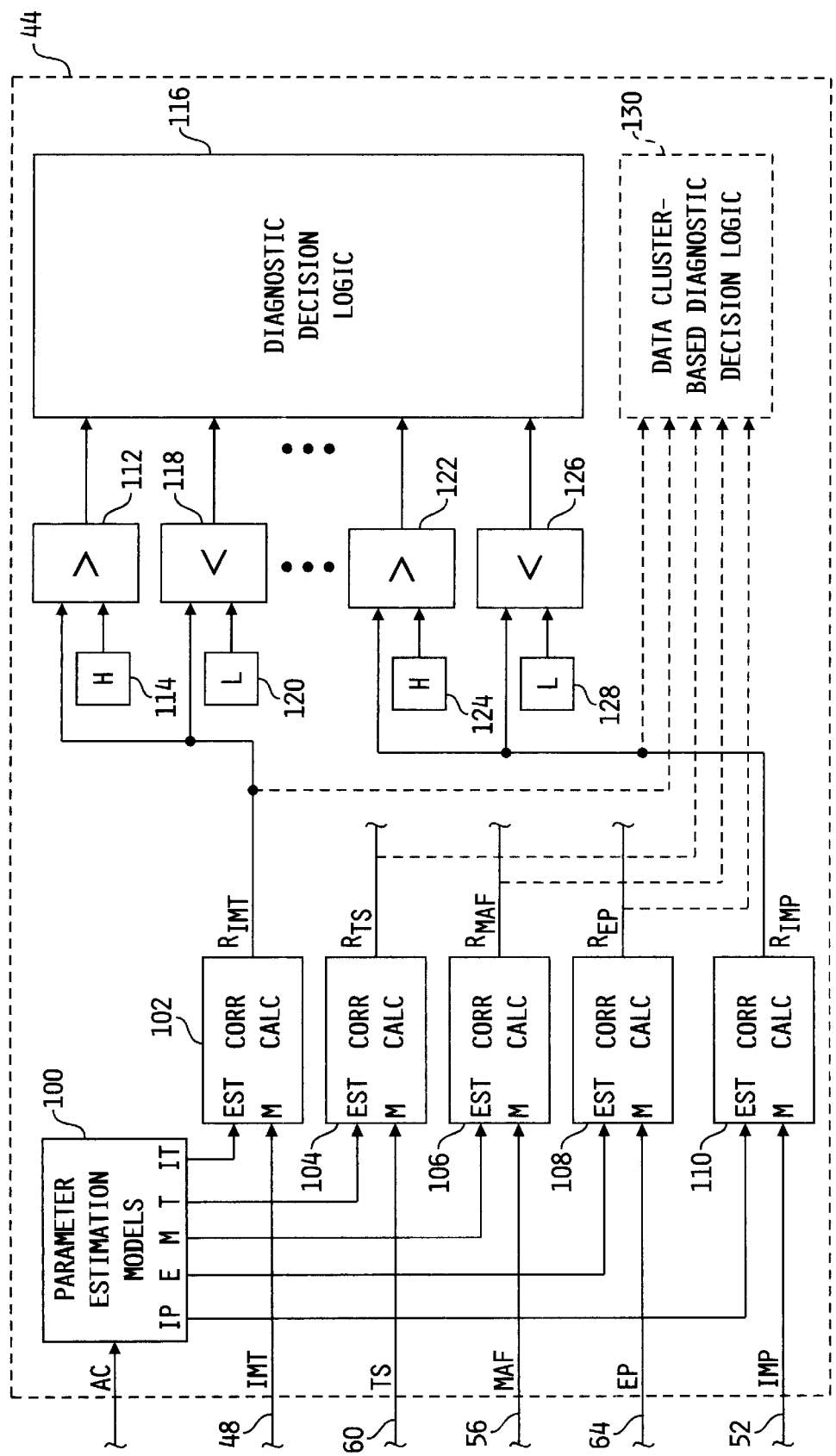
FIG. 4 is a diagrammatic illustration of one preferred embodiment of the air handling system actuator fault diagnostics block of FIG. 1, in accordance with the present invention.

Referring now to FIG. 4, one preferred embodiment of the air handling system actuator fault diagnostics block 44, in accordance with the present invention, is shown. Block 44 includes a parameter estimation model block 100 receiving an air handling control mechanism command signal at the air handling control mechanism command input (AC) thereof. In accordance with the present invention, block 44 may be configured to receive the commanded EGR value (CEGR) at input AC, or may be alternatively configured to receive the commanded VGT value (CVGT) threat, wherein the commanded VGT signal (CVGT) may correspond to any of the turbocharger swallowing capacity/efficiency control mechanisms illustrated and described with respect to FIGS. 2A–2C. In any case, the parameter estimation model block 100 preferably includes a number of parameter estimation models each responsive to the air handling control mechanism command signal provided thereto to provide a number of estimated sensor values corresponding to particular sensors contained within system 10. In the example illustrated in FIG. 4, the parameter estimation model block 100 preferably includes five parameter models for providing estimates of intake manifold pressure (IP), exhaust pressure (E), mass airflow into turbocharger compressor 16 (M), turbocharger speed (T) and intake manifold temperature (IT).

Figure 3A:
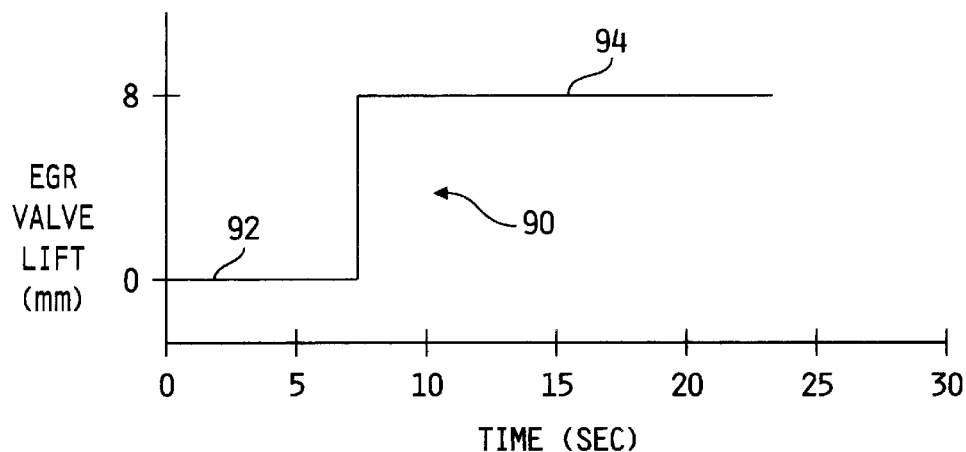
FIG. 3A is a plot of EGR valve lift vs. time illustrating an EGR valve control signal commanding an EGR valve from a fully closed to a fully open position.

In one preferred embodiment, each of the parameter estimation models contained within block 100 are first order models producing corresponding parameter estimates as a function of the air handling control mechanism command value (AC). For example, referring to FIGS. 3A and 3B, an example first order model of exhaust pressure is illustrated. In this example, the air handling control mechanism command value (AC) input to block 100 is the commanded EGR valve lift 90 illustrated in FIG. 3A having a fully closed position 92 and a fully open position 94 with a step change therebetween. When the EGR valve 38 is commanded from the fully closed position 92 to the fully open position 94 at approximately 7 seconds into the plot of FIG. 3A, the actual exhaust pressure produced by sensor 62 starts to drop as shown by waveform 96 in FIG. 3B. This sensor behavior is preferably modeled by block 100 according to the equation:

$$x(k+1)=0.988x(k)+u(k),$$

wherein u(k) corresponds to the EGR valve lift command 90 illustrated in FIG. 3A, and the exhaust pressure estimate value (E) is given by the equation:

$$E(k)=0.0156x(k).$$

Figure 3B:
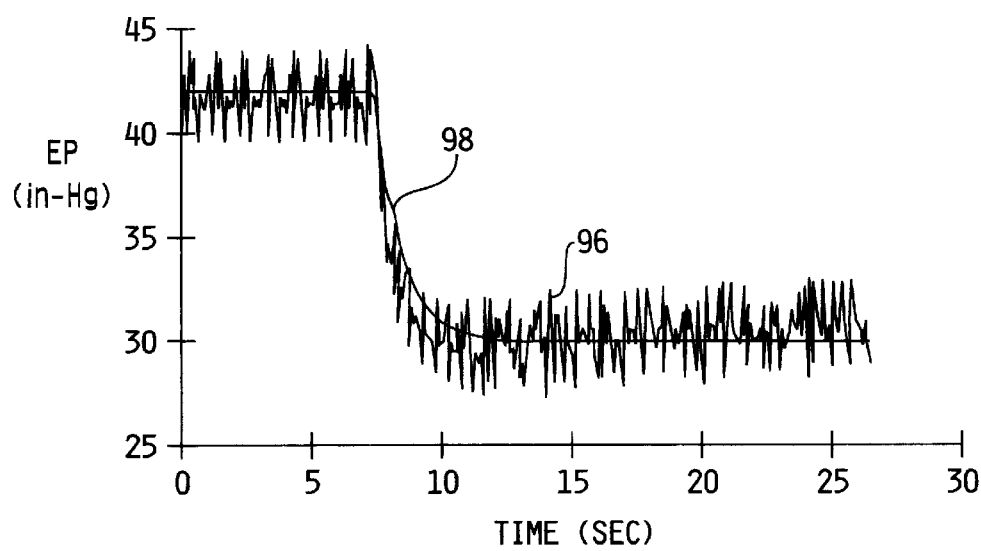
FIG. 3B is a plot of actual and estimated exhaust pressure vs. time illustrating an air handling control mechanism command-based model for estimating exhaust pressure, in accordance with the present invention.

For the given EGR valve lift command 90 illustrated in FIG. 3A, the predicted or estimated exhaust pressure value (E) 98 is shown in FIG. 3B as closely tracking the actual exhaust pressure measurement 96.

The parameter estimation models in model block 100 for the remaining engine operating parameters are preferably modeled in accordance with similar first order models as shown with respect to FIGS. 3A–3B, although it is to be understood that other model types and orders thereof are contemplated. In any case, referring back to FIG. 4, block 44 further includes a first correlation calculation block 102 having a first estimation input (EST) receiving the estimated intake manifold temperature signal (IT) and a second input receiving the actual intake manifold temperature signal on signal path 48. The correlation calculation block 102 is operable, as will be described in greater detail hereinafter, to produce a correlation coefficient $R_{IMT}$ at an output thereof. The output of block 102 is provided to a first input of an arithmetic operator block 112 having an second input receiving a high threshold value (H) from block 114. The output of arithmetic operator block 112 is provided to a diagnostic decision logic block 116. The output of correlation calculation block 102 is also provided to a first input of a second arithmetic operator block 118 having a second input receiving a low threshold value (L) from block 120. An output of arithmetic operator block 118 is provided to the diagnostic decision logic block 116. The arithmetic operator block 112 corresponds to a "greater than" operator and the arithmetic operator block 118 corresponds to a "less than" operator such that the output of block 112 is true only if the correlation coefficient $R_{IMT}$ is greater than H. and the output of arithmetic operator block 118 is true only if the correlation coefficient $R_{IMT}$ is less than L.

The air handling system actuator fault diagnostics block 44 further includes a second correlation calculation block 104 having a first estimation input (EST) receiving the estimated turbocharger speed value (T) from the parameter estimation model block 100 and a second input receiving the actual turbocharger speed signal on signal paths 60. Block 104 is operable to produce a correlation coefficient $R_{TS}$ as a function of the estimated and actual turbocharger speed values. Block 44 further includes arithmetic operator blocks similar to blocks 112 and 118 operable to provide a "true" signal to logic block 116 only if $R_{TS}$ is greater than H or is less than L.

Block 44 further includes a third correlation calculation block 106 having an estimation input (EST) receiving an estimated value of the mass airflow (M) from parameter estimation model block 100 and a second input receiving the actual mass airflow value on signal path 56. Block 106 is operable to produce a correlation coefficient $R_{MAF}$ as a function of the estimated and actual mass airflow signals. Arithmetic operator blocks identical to blocks 112–118 are further included to provide a "true" signal to logic block 116 only if $R_{MAF}$ is greater than H or is less than L.

Block 44 further includes a fourth correlation calculation block 108 having an estimation input (EST) receiving an estimated value of the exhaust pressure (E) produced by parameter estimation model block 100 and a second input receiving the actual exhaust pressure signal on signal path 64. Block 108 is operable to produce a correlation coefficient $R_{EP}$ as a function of the estimated and actual exhaust pressure values. Arithmetic operator blocks identical to blocks 112–118 are included and provide "true" logic values to logic block 116 only if $R_{EP}$ is greater than H or less than L.

Block 44 further includes a fifth correlation calculation block 110 having an estimation input (EST) receiving the estimated intake manifold pressure value (IP) from the parameter estimation model block 100 and a second input receiving the actual intake manifold pressure value on signal path 52. Block 110 is operable to produce a correlation coefficient $R_{IMP}$ as a function of the estimated and actual intake manifold pressure values. Arithmetic operator blocks 122 and 126 are identical to arithmetic operator blocks 112 and 118, and block 122 is operable to provide a "true" logic value to logic block 116 only if $R_{IMP}$ is greater than H provided by block 124, and arithmetic operator block 126 is operable to provide a "true" logic value to logic block 116 only if the correlation coefficient $R_{IMP}$ is less than L provided by block 128.

It is to be understood that while the present invention has been illustrated and described as diagnosing air handling control mechanism-related failures and fault conditions based on data provided by a number of physical engine operating parameter sensors, the present invention contemplates that any one or more of the engine operating parameter sensors shown and described may be omitted and replaced by a known "virtual sensor". For purposes of the present invention, a "virtual sensor" is defined as a known software algorithm operable to estimate operational values of the engine operating parameter in question based on information provided by other physical sensors and/or other virtual sensors. Those skilled in the art will recognize that air handling control mechanism-related failures may alternatively or additionally be diagnosed based on data provided by other or additional air handling system sensors, either physical or virtual. Examples of such other or additional air handling systems sensors may include, but are not limited to, a differential sensor for sensing a pressure differential across the EGR valve 38, an EGR valve position sensor for sensing a position of EGR valve 38 or of an actuator therefore, and the like.

In accordance with the present invention, each of the correlation calculation blocks 102–110 are operable to compute the corresponding correlation coefficient values from a number N, of samples thereof. Using the exhaust pressure correlation calculation block 108 as an example, the exhaust pressure correlation coefficient $R_{EP}$ is preferably computed according to the equation:

$$R_{EP} = \frac{1}{N-1} \sum \left( \frac{EP(k) - \overline{EP}}{SEP} \right)\left( \frac{E(k) - \overline{E}}{SE} \right)$$

where:

EP is the (actual) exhaust pressure signal,

E is the estimated exhaust pressure (provided by block 100), $\overline{EP}$=mean(EP(k)), SEP=standard deviation of EP(k), $\bar{E}$=mean(E(k)), and SE=standard deviation of E(k).

In terms of the exhaust pressure signal and exhaust pressure estimate illustrated in FIG. 3B, taking samples from EP(k) and E(k) between the 5$^{th}$ and 12$^{th}$ seconds yields a calculated correlation coefficient of $R_{EP}$=0.99, indicating that the first order model of the exhaust pressure estimate is acceptably accurate.

The air handling system actuator fault diagnostics embodiment described thus far with respect to FIG. 4 represents a multiple sensor fusion strategy wherein each sensor measurement is compared with its expected model response to an air handling control mechanism command (AC). This comparison yields correlation coefficients $R_{IMT}$, $R_{TS}$, $R_{MAF}$, $R_{EP}$ and $R_{IMP}$. Logic operator blocks 112, 118, 122 and 126 then compare the various correlation coefficient values with calibratable high and low threshold values (H and L) and provide corresponding logic signals to the diagnostic decision logic block 116. The diagnostic decision logic block 116 includes a number of decision structures for diagnosing any faults or failures associated with the air handling control mechanism corresponding to the air handling control mechanism command (AC) input to block 100. In one embodiment, diagnostic decision logic block 116 preferably includes a decision block indicating that the air handling control mechanism corresponding to the air handling control mechanism command value (AC) is working properly if all of the correlation coefficients are greater than the calibratable high value (H). Thus, the diagnostic decision logic block 116 preferably includes an outcome illustrated by the following table when all of the correlation coefficients are greater than H, wherein the air handling control mechanism in the example table corresponds to EGR valve actuator 68.

| $R_{IMP}$ | $R_{EP}$ | $R_{MAF}$ | $R_{TS}$ | $R_{IMT}$ | Conclusion |
|---|---|---|---|---|---|
| >H | >H | >H | >H | >H | EGR valve works properly |

The diagnostic decision logic block 116 is further preferably configured to indicate that the air handling control mechanism is stuck in a closed position if all of the correlation coefficients are less than the calibratable low value (L). Logic block 116 preferably thus preferably includes an outcome illustrated by the following table when all of the correlation coefficients are less L, wherein the air handling control mechanism in the example table is again the EGR valve actuator 68.

| $R_{IMP}$ | $R_{EP}$ | $R_{MAF}$ | $R_{TS}$ | $R_{IMT}$ | Conclusion |
|---|---|---|---|---|---|
| <L | <L | <L | <L | <L | EGR valve stuck closed |

The diagnostic decision logic block 116 is further preferably configured to indicate that the air handling control mechanism is working properly but that one of the engine operating parameter sensors has failed if all of the correlation coefficients are greater than the calibratable high value (H), with the exception of one correlation coefficient being below the calibratable low value (L). Logic block 116 preferably thus preferably includes an outcome illustrated by the following table when all but one (e.g., $R_{TS}$) of the correlation coefficients are greater than H, and the correlation coefficient not greater than H is less than L, wherein the air handling control mechanism in the example table is again the EGR valve actuator 68.

| $R_{IMP}$ | $R_{EP}$ | $R_{MAF}$ | $R_{TS}$ | $R_{IMT}$ | Conclusion |
|---|---|---|---|---|---|
| >H | >H | >H | <L | >H | EGR valve works properly, but turbo speed sensor fails. |

Figure 5:
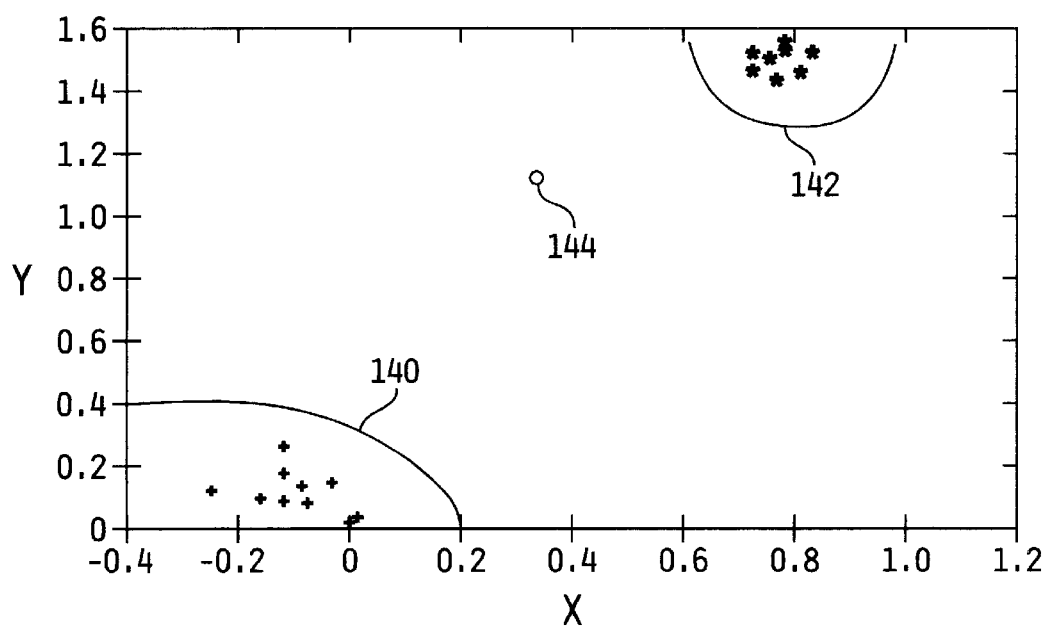
FIG. 5 is a plot of parameter residuals on a two-dimensional plan illustrating fault decision making based on data clustering, in accordance with the present invention.

As an alternative to the diagnostic decision logic block 116 and corresponding arithmetic operators 112, 118, 122 and 126, block 44 may be configured with a data cluster-based diagnostic decision logic block 130 having inputs receiving each of the correlation coefficients $R_{IMT}$, $R_{TS}$, $R_{MAF}$, $R_{EP}$ and $R_{IMP}$. The data cluster-based diagnostic decision logic block 130 is operable to perform the functions described hereinabove with respect to the diagnostic decision logic block 116 and supporting arithmetic operator blocks 112–126. Referring to FIG. 5, one example of the data cluster-based diagnostic decision logic block 130 is shown as a two-dimensional projection of the correlation coefficient vector [$R_{IMT}$, $R_{TS}$, $R_{MAF}$, $R_{EP}$, $R_{IMP}$] using well-known principal component analysis techniques. The diagnostic decision function performed by diagnostic decision logic 116 and supporting arithmetic operator blocks 112–126 is therefore made in block 130 based on data clustering. An example of the data clustering technique is shown in FIG. wherein boundary 140 identifies an air handling control mechanism failure boundary and boundary 142 identifies an air handling control mechanism working properly boundary. Thus, any point falling within boundary 140 indicates a failed air handling control mechanism (e.g., stuck valve, stuck actuator, etc.), and any point falling within boundary 142 indicates a properly working air handling control mechanism. Points falling in-between boundaries 140, 142, such as point 144, are analyzed in accordance with the third table shown by example above.

Regardless of the diagnostic decision logic strategy used, blocks 116 and 130 both include memory for logging faults therein. Preferably, any fault or failure associated with either of the air handling control mechanism or engine operating parameter sensor is logged within a corresponding memory for subsequent retrieval and analysis thereof.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A system for diagnosing fault conditions associated with an air handling control mechanism for an internal combustion engine, comprising:

an air handling control mechanism responsive to a mechanism command to control fluid flow through an air handling system of an internal combustion engine;

means for modeling a predicted response of an engine operating parameter as a function of said mechanism command;

means for monitoring said engine operating parameter and producing an engine operating parameter signal corresponding thereto;

means for computing a correlation coefficient as a function of said engine operating parameter signal and said predicted response; and means for diagnosing a fault associated with said air handling control mechanism if said correlation coefficient is below a first coefficient threshold.

2. The system of claim 1 wherein said means for diagnosing a fault includes means for diagnosing said air handling control mechanism as functioning properly if said correlation coefficient is above a second coefficient threshold larger than said first coefficient threshold.

3. The system of claim 1 further including:
an intake manifold coupled to said engine for receiving a flow of charge therein;
an exhaust manifold coupled to said engine for expelling engine exhaust therefrom; and
an exhaust gas recirculation (EGR) conduit having one end in fluid communications with said intake manifold and an opposite end in fluid communication with said exhaust manifold;
wherein said air handling control mechanism is an EGR valve disposed in line with said EGR conduit, said EGR valve responsive to said mechanism command to control exhaust gas flow therethrough from said exhaust manifold to said intake manifold.

4. The system of claim 1 further including:
an exhaust manifold coupled to said engine for expelling engine exhaust therefrom; and
a turbocharger turbine having a turbine inlet fluidly coupled to said exhaust manifold;
wherein said air handling control mechanism is a wastegate having a wastegate inlet disposed in fluid communications with said exhaust manifold, said wastegate responsive to said mechanism command to selectively route engine exhaust away from said turbine inlet.

5. The system of claim 1 further including:
an exhaust manifold coupled to said engine for expelling engine exhaust gas therefrom; and
an exhaust conduit fluidly coupled to said exhaust manifold;
wherein said air handling control mechanism is an exhaust throttle disposed in line with said exhaust conduit, said exhaust throttle responsive to said mechanism command to control exhaust gas flow through said exhaust conduit.

6. The system of claim 1 further including:
an exhaust manifold coupled to said engine for expelling engine exhaust gas therefrom; and
a turbocharger turbine having a turbine inlet fluidly coupled to said exhaust manifold and a turbine outlet expelling engine exhaust gas therefrom;
wherein said air handling control mechanism is a turbine actuator responsive to said mechanism command to control an exhaust gas swallowing capacity of said turbine.

7. The system of claim 1 wherein said means for modeling a predicted response of an engine operating parameter as a function of said mechanism command includes means for predicting said engine operating parameter in accordance with a first order model of said mechanism command.

8. The system of claim 1 wherein said means for computing a correlation coefficient as a function of said engine operating parameter signal and said predicted response includes means for computing said correlation coefficient as a function of a number of samples of said engine operating parameter signal and said predicted response.

9. A system for diagnosing fault conditions associated with an air handling control mechanism for an internal combustion engine, comprising:

an air handling control mechanism responsive to a mechanism command to control fluid flow through an air handling system of an internal combustion engine;
an engine parameter sensor producing an engine operating parameter signal indicative of an operational state of an engine operating parameter; and
an engine controller modeling a predicted response of said engine operating parameter as a function of said mechanism command, said engine controller computing a correlation coefficient as a function of said engine operating parameter signal and said predicted response and diagnosing a fault associated with said air handling control mechanism if said correlation coefficient is below a first coefficient threshold.

10. The system of claim 9 wherein said engine controller is configured to diagnose said air handling control mechanism as functioning properly if said correlation coefficient is above a second coefficient threshold larger than said first coefficient threshold.

11. The system of claim 9 further including an intake manifold coupled to said engine for receiving a flow of charge therein;
wherein said engine parameter sensor is an intake manifold temperature sensor producing an intake manifold temperature signal indicative of a temperature within said intake manifold;
and wherein said engine operating parameter signal is said intake manifold temperature signal.

12. The system of claim 9 further including an intake manifold coupled to said engine for receiving a flow of charge therein;
wherein said engine parameter sensor is an intake manifold pressure sensor producing an intake manifold pressure signal indicative of pressure within said intake manifold;
and wherein said engine operating parameter signal is said intake manifold pressure signal.

13. The system of claim 9 further including a turbocharger having a compressor inlet receiving fresh air and a compressor outlet fluidly coupled to an intake manifold of said engine;
wherein said engine parameter sensor is a mass air flow sensor producing a mass air flow signal indicative of a mass flow of air entering said compressor inlet;
and wherein said engine operating parameter signal is said mass air flow signal.

14. The system of claim 9 further including a turbocharger having a compressor fluidly coupled to an intake manifold of said engine and a turbine fluidly coupled to an exhaust manifold of said engine;
wherein said engine parameter sensor is a turbocharger speed sensor producing a turbocharger speed signal indicative of rotational speed of said turbocharger;
and wherein said engine operating parameter signal is said turbocharger speed signal.

15. The system of claim 9 further including an exhaust manifold fluidly coupled to said engine for expelling engine exhaust gas therefrom;
wherein said engine parameter sensor is an exhaust pressure sensor producing an exhaust pressure signal indicative of a pressure within said exhaust manifold;
and wherein said engine operating parameter signal is said turbocharger speed signal.

16. The system of claim 9 further including:
an intake manifold coupled to said engine for receiving a flow of charge therein;

an exhaust manifold coupled to said engine for expelling engine exhaust therefrom; and an exhaust gas recirculation (EGR) conduit having one end in fluid communications with said intake manifold and an opposite end in fluid communication with said exhaust manifold;

wherein said air handling control mechanism is an EGR valve disposed in line with said EGR conduit, said EGR valve responsive to said mechanism command to control exhaust gas flow therethrough from said exhaust manifold to said intake manifold.

17. The system of claim 9 further including:

an exhaust manifold coupled to said engine for expelling engine exhaust therefrom; and a turbocharger turbine having a turbine inlet fluidly coupled to said exhaust manifold;

wherein said air handling control mechanism is a wastegate having a wastegate inlet disposed in fluid communications with said exhaust manifold, said wastegate responsive to said mechanism command to selectively route engine exhaust away from said turbine inlet.

18. The system of claim 9 further including:

an exhaust manifold coupled to said engine for expelling engine exhaust gas therefrom; and an exhaust conduit fluidly coupled to said exhaust manifold;

wherein said air handling control mechanism is an exhaust throttle disposed in line with said exhaust conduit, said exhaust throttle responsive to said mechanism command to control exhaust gas flow through said exhaust conduit.

19. The system of claim 9 further including:

an exhaust manifold coupled to said engine for expelling engine exhaust gas therefrom; and a turbocharger turbine having a turbine inlet fluidly coupled to said exhaust manifold and a turbine outlet expelling engine exhaust gas therefrom;

wherein said air handling control mechanism is a turbine actuator responsive to said mechanism command to control an exhaust gas swallowing capacity of said turbine.

20. The system of claim 9 wherein said engine controller is configured to predict said engine operating parameter in accordance with a first order model of said mechanism command.

21. The system of claim 9 wherein said engine controller is configured to compute said correlation coefficient as a function of a number of samples of said engine operating parameter signal and said predicted response.

22. A system for diagnosing fault conditions associated with an air handling control mechanism for an internal combustion engine, comprising:

an air handling control mechanism responsive to a mechanism command to control fluid flow through an air handling system of an internal combustion engine;

a number of engine parameter sensors producing engine operating parameter signals indicative of operational states of a corresponding number of different engine operating parameters; and an engine controller modeling predicted responses of said number of engine operating parameters each as a different function of said mechanism command, said controller computing a number of correlation coefficients each as a function of one of said number of engine operating parameter signals and a corresponding one of said predicted responses, said controller diagnosing a fault associated with said air handling control mechanism if at least some of said correlation coefficients are below a first coefficient threshold.

23. The system of claim 22 wherein said engine controller is configured to diagnose said air handling control mechanism as functioning properly if at least some of said correlation coefficients are above a second coefficient threshold larger than said first coefficient threshold.

24. The system of claim 23 wherein said engine controller is configured to diagnose said air handling control mechanism as functioning properly if one of said correlation coefficients is below said first coefficient threshold while remaining ones of said correlation coefficients are above said second coefficient threshold, said engine controller diagnosing a fault associated with an appropriate one of said number of engine operating parameter sensors corresponding to said one of said correlation coefficients below said first coefficient threshold.

25. The system of claim 22 further including an intake manifold coupled to said engine for receiving a flow of charge therein;

wherein one of said engine parameter sensors is an intake manifold temperature sensor producing an intake manifold temperature signal indicative of a temperature within said intake manifold;

and wherein a corresponding one of said engine operating parameter signals is said intake manifold temperature signal.

26. The system of claim 22 further including an intake manifold coupled to said engine for receiving a flow of charge therein;

wherein one of said engine parameter sensors is an intake manifold pressure sensor producing an intake manifold pressure signal indicative of pressure within said intake manifold; and wherein a corresponding one of said engine operating parameter signals is said intake manifold pressure signal.

27. The system of claim 22 further including a turbocharger having a compressor inlet receiving fresh air and a compressor outlet fluidly coupled to an intake manifold of said engine;

wherein one of said engine parameter sensors is a mass air flow sensor producing a mass air flow signal indicative of a mass flow of air entering said compressor inlet;

and wherein a corresponding one of said engine operating parameter signals is said mass air flow signal.

28. The system of claim 22 further including a turbocharger having a compressor fluidly coupled to an intake manifold of said engine and a turbine fluidly coupled to an exhaust manifold of said engine;

wherein one of said engine parameter sensors is a turbocharger speed sensor producing a turbocharger speed signal indicative of rotational speed of said turbocharger;

and wherein a corresponding one of said engine operating parameter signals is said turbocharger speed signal.

29. The system of claim 22 further including an exhaust manifold fluidly coupled to said engine for expelling engine exhaust gas therefrom;

wherein one of said engine parameter sensors is an exhaust pressure sensor producing an exhaust pressure signal indicative of a pressure within said exhaust manifold;

and wherein a corresponding one of said engine operating parameter signals is aid exhaust pressure signal.

30. The system of claim 22 further including:

an intake manifold coupled to said engine for receiving a flow of charge therein;

an exhaust manifold coupled to said engine for expelling engine exhaust therefrom; and an exhaust gas recirculation (EGR) conduit having one end in fluid communications with said intake manifold and an opposite end in fluid communication with said exhaust manifold;

wherein said air handling control mechanism is an EGR valve disposed in line with said EGR conduit, said EGR valve e responsive to said mechanism command to control exhaust gas flow therethrough from said exhaust manifold to said intake manifold.

31. The system of claim 22 further including:

an exhaust manifold coupled to said engine for expelling engine exhaust therefrom; and a turbocharger turbine having a turbine inlet fluidly coupled to said exhaust manifold;

wherein said air handling control mechanism is a wastegate having a wastegate inlet disposed in fluid communications with said exhaust manifold, said wastegate responsive to said mechanism command to selectively route engine exhaust away from said turbine inlet.

32. The system of claim 22 further including:

an exhaust manifold coupled to said engine for expelling engine exhaust gas therefrom; and an exhaust conduit fluidly coupled to said exhaust manifold;

wherein said air handling control mechanism is an exhaust throttle disposed in line with said exhaust conduit, said exhaust throttle responsive to said mechanism command to control exhaust gas flow through said exhaust conduit.

33. The system of claim 22 further including:

an exhaust manifold coupled to said engine for expelling engine exhaust gas therefrom; and a turbocharger turbine having a turbine inlet fluidly coupled to said exhaust manifold and a turbine outlet expelling engine exhaust gas therefrom;

wherein said air handling control mechanism is a turbine actuator responsive to said mechanism command to control an exhaust gas swallowing capacity of said turbine.

* * * * *

UNITED STATES PATENT AND TRADEMARK OFFICE
CERTIFICATE OF CORRECTION

PATENT NO. : 6,497,227 B2
DATED : December 24, 2002
INVENTOR(S) : Yue Yun Wang et al.

It is certified that error appears in the above-identified patent and that said Letters Patent is hereby corrected as shown below:

Column 5,
Line 10, please delete "threat." and replace with -- thereat. --.
Line 23, please delete "therefore" and replace with -- therefor --.

Column 6,
Line 42, please delete "threat," and replace with -- thereat, --.

Column 7,
Line 43, please delete "H." and replace with -- H, --.

Column 10,
Line 3, please delete "FIG." and replace with -- FIG. 5 --.

Column 14,
Line 67, please delete "aid" and replace with -- said --.

Column 15,
Line 12, please delete "valve e" and replace with -- valve --.

Signed and Sealed this

Tenth Day of June, 2003

JAMES E. ROGAN
*Director of the United States Patent and Trademark Office*